United States Patent
Venkat Narayan et al.

(10) Patent No.: US 9,820,090 B1
(45) Date of Patent: Nov. 14, 2017

(54) ENHANCED FALLBACK MECHANISM FOR SLP CONNECTION DURING EMERGENCY SUPL SESSIONS

(71) Applicant: QUALCOMM Incorporated, San Diego, CA (US)

(72) Inventors: Govind Ram Venkat Narayan, San Diego, CA (US); Amit Jain, San Diego, CA (US); Santosh Munirathna, San Diego, CA (US); Andreas Klaus Wachter, Menlo Park, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/266,174

(22) Filed: Sep. 15, 2016

(51) Int. Cl.
  H04M 11/04 (2006.01)
  H04W 4/02 (2009.01)
  H04W 4/16 (2009.01)
  H04L 29/06 (2006.01)
  H04L 29/12 (2006.01)
  H04W 76/00 (2009.01)
  H04W 76/02 (2009.01)
  H04W 12/06 (2009.01)

(52) U.S. Cl.
  CPC ........... H04W 4/02 (2013.01); H04L 61/1511 (2013.01); H04L 63/166 (2013.01); H04L 69/164 (2013.01); H04W 4/16 (2013.01); H04W 76/007 (2013.01); H04W 76/027 (2013.01); H04L 63/0823 (2013.01); H04W 12/06 (2013.01)

(58) Field of Classification Search
  CPC ....... H04W 4/02; H04W 4/16; H04W 76/007; H04W 76/027; H04W 12/06; H04L 69/164; H04L 61/1511; H04L 63/166; H04L 63/0823
  USPC ...................... 455/404.1, 404.2, 414.1, 456.1
  See application file for complete search history.

(56) References Cited

U.S. PATENT DOCUMENTS

| | | | |
|---|---|---|---|
| 2008/0233931 A1* | 9/2008 | Shim | H04W 4/22 455/414.3 |
| 2009/0156253 A1 | 6/2009 | Shi et al. | |
| 2011/0004672 A1* | 1/2011 | Garcia-Martin | H04W 4/02 709/220 |
| 2012/0178411 A1 | 7/2012 | Li et al. | |
| 2012/0202517 A1 | 8/2012 | Edge et al. | |
| 2015/0065077 A1 | 3/2015 | Kim et al. | |

FOREIGN PATENT DOCUMENTS

KR  20110091305 A  8/2011

* cited by examiner

Primary Examiner — Wayne Cai
(74) Attorney, Agent, or Firm — Kilpatrick Townsend & Stockton, LLP (57) ABSTRACT

Techniques disclosed herein are generally directed toward providing a fallback mechanism to use when the authentication session between the SET and E-SLP fails. In particular, the techniques provided herein allow the SET to attempt to connect with SLPs using given and/or generated information. As such, the techniques provided herein increase the likelihood that the SET will be able to complete a successful SUPL session, and a location of the SET will be provided to an emergency response service.

30 Claims, 7 Drawing Sheets

ENHANCED FALLBACK MECHANISM FOR SLP CONNECTION DURING EMERGENCY SUPL SESSIONS

BACKGROUND

The Open Mobile Alliance (OMA) Secure User Plane Location (SUPL) is an IP-based protocol for location determination of mobile devices (such as mobile phones), known in OMA specifications as SUPL Enabled Terminals, or SETs. OMA SUPL v2.0 introduced the capability to support Emergency SUPL Location Platforms (E-SLPs) interacting with SETs to assist in locating users in emergency situations (e.g., when an emergency call is placed using the SET). Problematically, however, the protocol does not indicate what should happen in the case of an authentication failure during security negotiation in these emergency situations. This can result in delays that can be costly during an emergency.

SUMMARY

Techniques disclosed herein are generally directed toward providing a fallback mechanism to use when the authentication session between the SET and E-SLP fails. In particular, the techniques provided herein allow the SET to attempt to connect with SLPs using given and/or generated information. As such, the techniques provided herein increase the likelihood that the SET will be able to complete a successful SUPL session, and a location of the SET will be provided to an emergency response service An example method of establishing a Secure User Plane Location (SUPL) session between a SUPL Enabled Terminal (SET) and an Emergency SUPL Location Platform (E-SLP), according to the description, comprises receiving, by the SET, a Fully-Qualified Domain Name (FQDN) of a first E-SLP in a SUPL INIT message from the first E-SLP, sending a first set of data to establish a SUPL session with the first E-SLP using the FQDN of the first E-SLP, and receiving an indication that the SUPL session with the first E-SLP cannot be established. The method further comprises obtaining a mobile country code (MCC) and a mobile network code (MNC) associated with a mobile network to which the SET is communicatively connected, generating information for contacting a second E-SLP based on the MCC and MNC; and sending a second set of data to establish a SUPL session with the second E-SLP using the generated information for contacting the second E-SLP.

The method may include one or more of the following features. The method may comprise receiving an indication that the SUPL session with the second E-SLP cannot be established, determining a first Home SUPL Location Platform (H-SLP) based on a particular carrier for the SET; and sending a third set of data to establish a SUPL session with the first H-SLP. The method may comprise receiving an indication that the SUPL session with the first H-SLP cannot be established, generating information for contacting a second H-SLP based on the MCC and MNC, and sending a fourth set of data to establish a SUPL session with the second H-SLP using the generated information for contacting the second H-SLP. The SUPL session with the second E-SLP may comprise a secure Transport Layer Security (TLS) connection. the SUPL INIT message may be received by the SET via Short Message Service (SMS). The SUPL INIT message is received by the SET via User Datagram Protocol (UDP) or Internet Protocol (IP), or both. The SUPL INIT message is received in response to an emergency call made from the SET. Sending the first set of data may comprise at least one of sending a domain name system (DNS) query with the FQDN of the first E-SLP, sending a Transmission Control Protocol (TCP) connection request with an Internet protocol (IP) address of the first E-SLP, or sending information to the first E-SLP for establishing a secure socket layer (SSL) session, or any combination thereof. Receiving an indication that the SUPL session with the first E-SLP cannot be established may comprise at least one of receiving an indication that a domain name of the first E-SLP cannot be resolved, receiving an indication that a Transmission Control Protocol (TCP) connection with the first E-SLP has not been established or has timed out, or receiving an indication that an SSL session with the first E-SLP has not been established or has timed out, or any combination thereof. Generating information for contacting the second E-SLP may comprise generating an FQDN of the second E-SLP.

An example mobile device, according to the description, comprises a Secure User Plane Location (SUPL) Enabled Terminal (SET), the mobile device comprising a wireless communication interface, a memory, and a processing unit communicatively coupled with the wireless communication interface and the memory. The processing unit may be configured to cause the mobile device to receive, via the wireless communication interface, a Fully-Qualified Domain Name (FQDN) of a first Emergency SUPL Location Platform (E-SLP) in a SUPL INIT message from the first E-SLP, send, via the wireless communication interface, a first set of data to establish a SUPL session with the first E-SLP using the FQDN of the first E-SLP, and receive, via the wireless communication interface, an indication that the SUPL session with the first E-SLP cannot be established. The processing unit may further be configured to cause the mobile device to obtain a mobile country code (MCC) and a mobile network code (MNC) associated with a mobile network to which the mobile device is communicatively connected, generate information for contacting a second E-SLP based on the MCC and MNC, and send, via the wireless communication interface, a second set of data to establish a SUPL session with the second E-SLP using the generated information for contacting the second E-SLP.

The mobile device may include one or more of the following features. The processing unit is further configured to cause the mobile device to receive, via the wireless communication interface, an indication that the SUPL session with the second E-SLP cannot be established, determine a first Home SUPL Location Platform (H-SLP) based on a particular carrier for the mobile device, and send, via the wireless communication interface, a third set of data to establish a SUPL session with the first H-SLP. The processing unit may be further configured to cause the mobile device to receive, via the wireless communication interface, an indication that the SUPL session with the first H-SLP cannot be established, generate information for contacting a second H-SLP based on the MCC and MNC, and send, via the wireless communication interface, a fourth set of data to establish a SUPL session with the second H-SLP using the generated information for contacting the second H-SLP. The processing unit may be further configured to cause the mobile device to establish a secure Transport Layer Security (TLS) connection with the second E-SLP. The processing unit may be further configured to cause the mobile device to receive the SUPL INIT message by Short Message Service (SMS). The processing unit may be further configured to cause the mobile device to receive the SUPL INIT message by User Datagram Protocol (UDP) or Internet Protocol (IP), or both. The processing unit may be further configured to cause the mobile device to receive the SUPL INIT message in response to an emergency call made from the mobile device. The processing unit may be further configured to cause the mobile device to send the first set of data by sending at least one of domain name system (DNS) query with the FQDN of the first E-SLP, a Transmission Control Protocol (TCP) connection request with an Internet protocol (IP) address of the first E-SLP, or information to the first E-SLP for establishing a secure socket layer (SSL) session, or any combination thereof. The processing unit may be further configured to cause the mobile device to receive the indication that the SUPL session with the first E-SLP cannot be established by receiving at least one of an indication that a domain name of the first E-SLP cannot be resolved, an indication that a Transmission Control Protocol (TCP) connection with the first E-SLP has not been established or has timed out, or indication that an SSL session with the first E-SLP has not been established or has timed out, or any combination thereof. The processing unit may be further configured to cause the mobile device to generate the information for contacting the second E-SLP by generating an FQDN of the second E-SLP.

An example apparatus for establishing a Secure User Plane Location (SUPL) session between a SUPL Enabled Terminal (SET) and an Emergency SUPL Location Platform (E-SLP), according to the disclosure, comprises means for receiving a Fully-Qualified Domain Name (FQDN) of a first E-SLP in a SUPL INIT message from the first E-SLP, means for sending a first set of data to establish a SUPL session with the first E-SLP using the FQDN of the first E-SLP, and means for receiving an indication that the SUPL session with the first E-SLP cannot be established. The example apparatus further comprises means for obtaining a mobile country code (MCC) and a mobile network code (MNC) associated with a mobile network to which the SET is communicatively connected, means for generating information for contacting a second E-SLP based on the MCC and MNC, and means for sending a second set of data to establish a SUPL session with the second E-SLP using the generated information for contacting the second E-SLP.

The apparatus may include one or more of the following features. The apparatus may include means for receiving an indication that the SUPL session with the second E-SLP cannot be established, means for determining a first Home SUPL Location Platform (H-SLP) based on a particular carrier for the SET, means for sending a third set of data to establish a SUPL session with the first H-SLP. The apparatus may include means for receiving an indication that the SUPL session with the first H-SLP cannot be established, means for generating information for contacting a second H-SLP based on the MCC and MNC, and means for sending a fourth set of data to establish a SUPL session with the second H-SLP using the generated information for contacting the second H-SLP. The apparatus may include means for establishing a secure Transport Layer Security (TLS) connection. The apparatus may further comprise means for receiving the SUPL INIT message via Short Message Service (SMS) and/or means for receiving the SUPL INIT message via User Datagram Protocol (UDP) or Internet Protocol (IP), or both. The apparatus may further comprise means for receiving the SUPL INIT message in response to an emergency call made from the SET. The apparatus may further comprise means for sending the first set of data by sending at least one of, a domain name system (DNS) query with the FQDN of the first E-SLP, a Transmission Control Protocol (TCP) connection request with an Internet protocol (IP) address of the first E-SLP, or information to the first E-SLP for establishing a secure socket layer (SSL) session, or any combination thereof. The apparatus may further comprise means for receiving the indication that the SUPL session with the first E-SLP cannot be established by receiving at least one of, an indication that a domain name of the first E-SLP cannot be resolved, an indication that a Transmission Control Protocol (TCP) connection with the first E-SLP has not been established or has timed out, or an indication that an SSL session with the first E-SLP has not been established or has timed out, or any combination thereof.

An example non-transitory machine-readable medium having instructions embedded thereon for establishing a Secure User Plane Location (SUPL) session between a SUPL Enabled Terminal (SET) and an Emergency SUPL Location Platform (E-SLP), the instructions comprising computer code for, receiving a Fully-Qualified Domain Name (FQDN) of a first E-SLP in a SUPL INIT message from the first E-SLP, sending a first set of data to establish a SUPL session with the first E-SLP using the FQDN of the first E-SLP, and receiving an indication that the SUPL session with the first E-SLP cannot be established. The instructions may further comprise computer code for obtaining a mobile country code (MCC) and a mobile network code (MNC) associated with a mobile network to which the SET is communicatively connected, generating information for contacting a second E-SLP based on the MCC and MNC, and sending a second set of data to establish a SUPL session with the second E-SLP using the generated information for contacting the second E-SLP.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Several illustrative embodiments will now be described with respect to the accompanying drawings, which form a part hereof. The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

The subject matter disclosed herein relates to determining the location of a mobile device in an emergency situation. In particular, techniques described herein are generally directed toward a SUPL environment in which backup procedures are provided in the event that a SET fails to establish a secure connection with an E-SLP during an emergency call, helping minimize potential delays in determining the location of the SET to help ensuring emergency personnel are not delayed in an emergency response.

Figure 1:
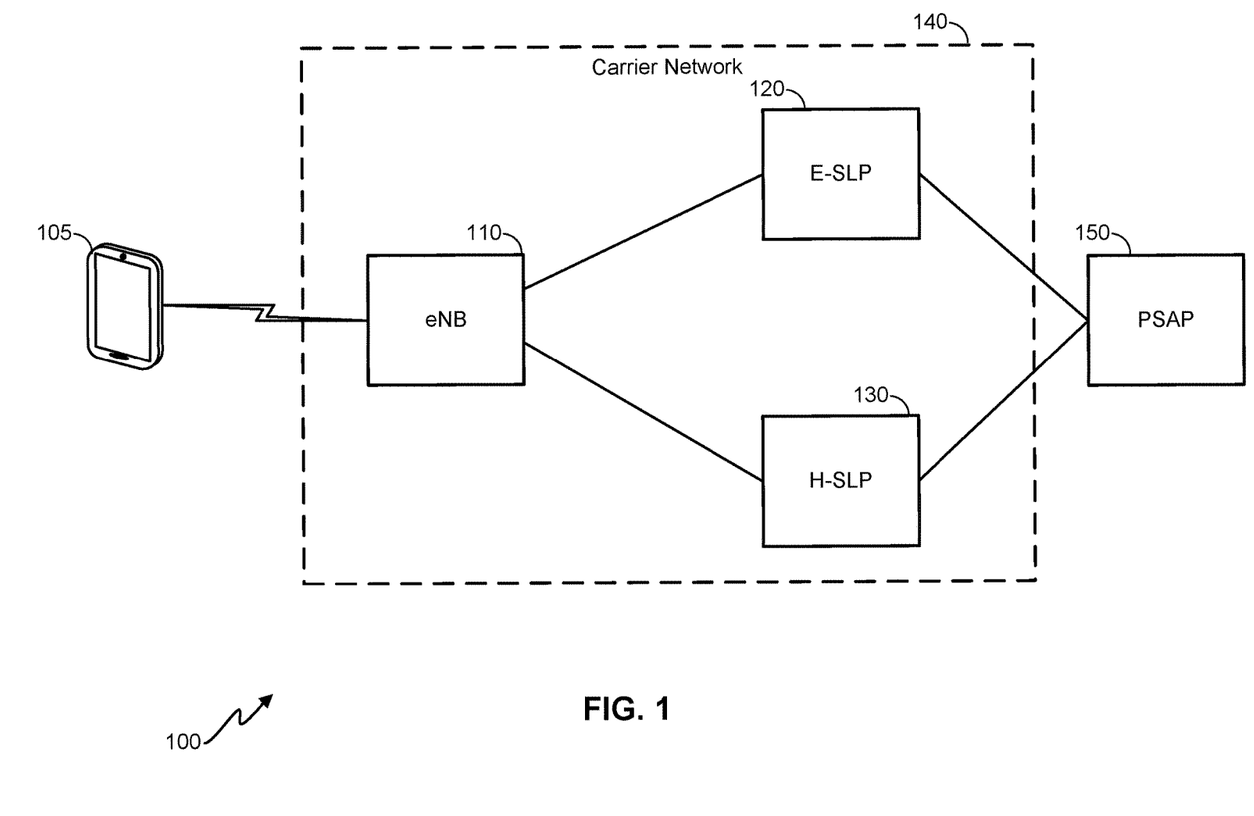
FIG. 1 is a simplified block diagram illustrating the architecture of a system for enabling location assistance during an emergency call, according to an embodiment.

FIG. 1 is a simplified block diagram illustrating the architecture of a system 100 for enabling location assistance during an emergency call, according to an embodiment. Among other components, the system includes a SET 105 and a carrier network 140. The carrier network 140 may include an Evolved Node B (eNodeB, or eNB) 110, an E-SLP 120, and a Home SLP (H-SLP) 130. Finally, the system 100 includes a public safety answering point (PSAP) 150. Lines connecting components indicate how components may be communicatively connected.

It will be understood that the system 100 illustrated in FIG. 1 are greatly simplified. In practice, embodiments may include additional and/or intervening components, such as additional components and data paths of the carrier network 140. Moreover, components may be communicatively coupled via a variety of data communication networks, including public and/or private networks utilizing any of a variety of wired and/or wireless communication technologies, as described herein below with regard to FIGS. 6 and 7.

The SET 105 can comprise a mobile device or any other electrical device that may need a position determination. As such, the SET 105 may comprise a mobile phone, tablet computer, laptop computer, portable media player, personal digital assistant, wearable computer (e.g., smart watch, head-mounted display, etc.), or the like. In some embodiments, the SET 105 may be integrated into another mobile system, such as an in-vehicle system (IVS), which can be located on a car, bus, boat, or other vehicle. The SET 105 can perform functions described in the embodiments disclosed herein using one or more hardware and/or software components thereof. An example SET 105 is described in more detail below, in reference to FIG. 6.

The eNB 110 can comprise a device or system providing a gateway for the SET 105 to access the carrier network 140. As such, the eNB can comprise a base station, with one or more antennas communicatively coupled with one or more computers and/or other communication devices. The eNB 110 can wirelessly communicate with the SET 105 and/or other mobile devices within range of wireless communication. The eNB 110 can also communicate with the E-SLP 120 and H-SLP 130). In some embodiments, carrier network 140 may comprise cellular communication network infrastructure such as, for example, a base station controller, packet-based, and/or circuit-based switching center (not shown) to facilitate mobile cellular communication with the SET 105. Additionally, although the system 100 illustrated in FIG. 1 shows only one of each of each of the SET 105, E-SLP 120, H-SLP, and PSAP 150, embodiments may comprise a many (e.g., hundreds, thousands, millions, or more) of any or all components.

The E-SLP 120 and H-SLP 130 can comprise servers configured to provide location information and/or assistance as described herein, and may be configured in accordance with specifications defined by OMA. As such, the E-SLP 120 and H-SLP 130 may be executed on one or more computer systems that may be disposed in different geographical locations. That said, some embodiments may execute the functionality of both the E-SLP 120 and H-SLP on single computer system. An example computer system is described below in relation to FIG. 7.

The PSAP 150 may be a server operated by an emergency service provider and may be communicatively coupled with one or more components configured to receive an emergency call made by the mobile device (e.g., through a voice channel of the carrier network 140 (not shown)). (Hardware and/or software of a computer system that may be configured to execute the PSAP 150 are discussed below in relation to FIG. 7.) During such an emergency call, components illustrated in FIG. 1 can operate to provide location of the SET 105 in the manner shown in FIG. 2.

Figure 2:
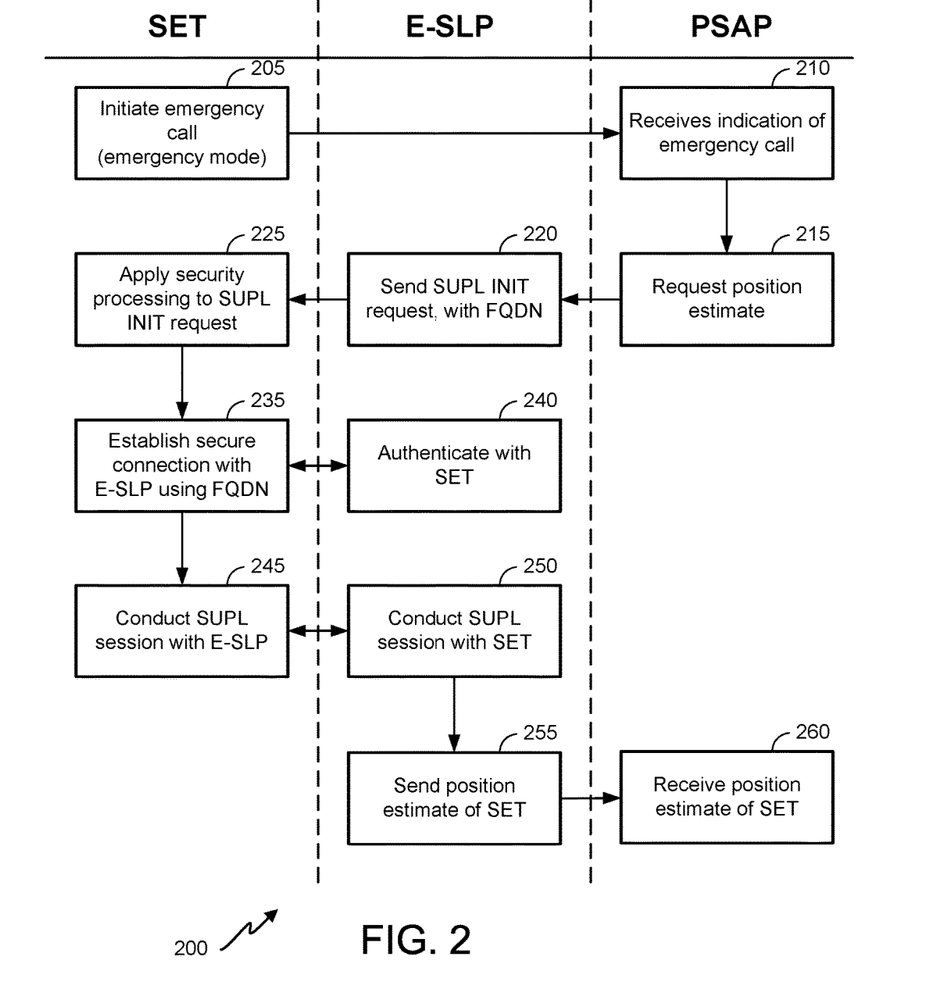
FIG. 2 is a swim-lane diagram illustrating various interactions between a SET, E-SLP, and public safety answering point (PSAP) for performing a method of providing a position estimate of the SET, according to one embodiment.

FIG. 2 is a swim-lane diagram illustrating various interactions between a SET, E-SLP, and PSAP for performing a method of providing a position estimate of the SET, according to one embodiment. Here, the SET, E-SLP, and PSAP can may be part of a larger system as illustrated in FIG. 1, for example. It will be understood that alternative embodiments may include additional and/or alternative functions, omit and/or rearrange functions, or otherwise alter the method 200 as illustrated in FIG. 2, according to desired functionality. Additionally, interactions between components may utilize any of a variety of technologies, standards, and/or protocols for communication. As previously indicated, for example, interactions may be governed by standards provided by the OMA.

The method 200 may begin with the functionality of block 205, where the SET initiates an emergency call. Here, the emergency call (e.g., "9-1-1") may be dialed using an emergency mode of the SET or may be recognized by the SET as an emergency number, which may put the SET in an emergency mode. When in the emergency mode, the SET may be receptive to a SUPL INIT message (e.g., as defined by the OMA SUPL standard), which may be delivered using Short Message Service (SMS) and/or User Datagram Protocol/Internet Protocol (UDP/IP).

At block 210, the PSAP receives an indication of the emergency call made by the SET. In some embodiments, the PSAP may be part of an emergency response system operated by an emergency response provider, who receives the emergency call. In some embodiments, the PSAP itself may include the functionality to receive the emergency call from the SET. b In any case, the PSAP is notified of the emergency call and, at block 215, requests a position estimate from the E-SLP. Because different carrier networks may have different E-SLPs, the PSAP may determine which E-SLP to contact by determining the carrier network through which the emergency call was made. The PSAP may have a lookup table, database, or other data structure enabling the PSAP to quickly determine the E-SLP to use based on the carrier network of the emergency call.

At block 220, the E-SLP, in response to receiving the request for the position estimate from the PSAP, sends a SUPL INIT message to the SET (e.g., via SMS or UDP/IP). This request can trigger the SET to initiate a SUPL session with the E-SLP, and the SUPL INIT message may include the Fully-Qualified Domain Name (FQDN) of the E-SLP, with which the SET may contact the E-SLP. The SUPL INIT message may also include a SUPL session identifier that the SET can use during a SUPL session. At block 225, the SET can then apply security processing to the SUPL INIT message (e.g., according to governing standards) to extract the FQDN and/or otherwise interpret the SUPL INIT message.

At block 235, the SET establishes a security connection with the E-SLP, using the FQDN provided in the SUPL INIT message. According to some embodiments, this may comprise establishing a secure Transport Layer Security (TLS) connection to the E-SLP. As part of the TLS handshake, the E-SLP may provide authentication information to the SET (e.g., an authentication certificate with a chain back to the root certificate pre-provisioned on the SET) at block 240. Additional or alternative techniques for authentication may be utilized in some embodiments.

At blocks 245 and 250, the SET and E-SLP then conduct a SUPL session. During the session, the SET may provide the E-SLP with the SUPL session identifier provided in the SUPL INIT message as verification of the SET's identity. The SUPL session may be conducted in with governing standards (e.g., an applicable SUPL standard provided by the OMA) and may result in the E-SLP obtaining a position estimate of the SET.

The E-SLP then provides the position estimate of the SET to the PSAP at block 255, which is received by the PSAP at block 260.

The method 200 illustrated in FIG. 200 can provide valuable location information to the PSAP to help emergency personnel determine where the person making the emergency call with the SET may be located, which may expedite providing aid to those that may need help urgently. Problematically, however, the SET, E-SLP, and PSAP may experience difficulties in performing the method 200. In particular, the SET may be unable to establish a secure connection with the E-SLP at block 235.

A failure to secure a connection with the E-SLP can occur due to any of a variety of reasons. For example, there could be connectivity problems in the communication network connecting the SET and E-SLP. In some instances, the SET may not be able to resolve the uniform resource locator (URL) (e.g., the FQDN) of the E-SLP after initiating a domain name system (DNS) lookup simply because the DNS lookup can fail or because network traffic conditions can cause the SET to timeout if it does not receive a DNS response after a certain timeout period (e.g., 12 seconds). In some instances, network traffic conditions can cause a TCP connection attempt with the E-SLP to fail. Secure Session (SSL) session establishment with E-SLP can may also fail if the negotiation of the SSL certificate or SSL key exchange fails. Alternatively, the E-SLP server may be down due to hardware and/or software malfunctions, a power outage, and/or the like.

The failure to establish a secure connection with the E-SLP can result in a failed SUPL session, which can cause costly delays in an emergency response. According to techniques provided herein, additional measures may be taken to help ensure that the SET is able to conduct a SUPL session with an SLP (e.g., an E-SLP or H-SLP), and a resulting position estimate is provided to the PSAP.

Figure 3:
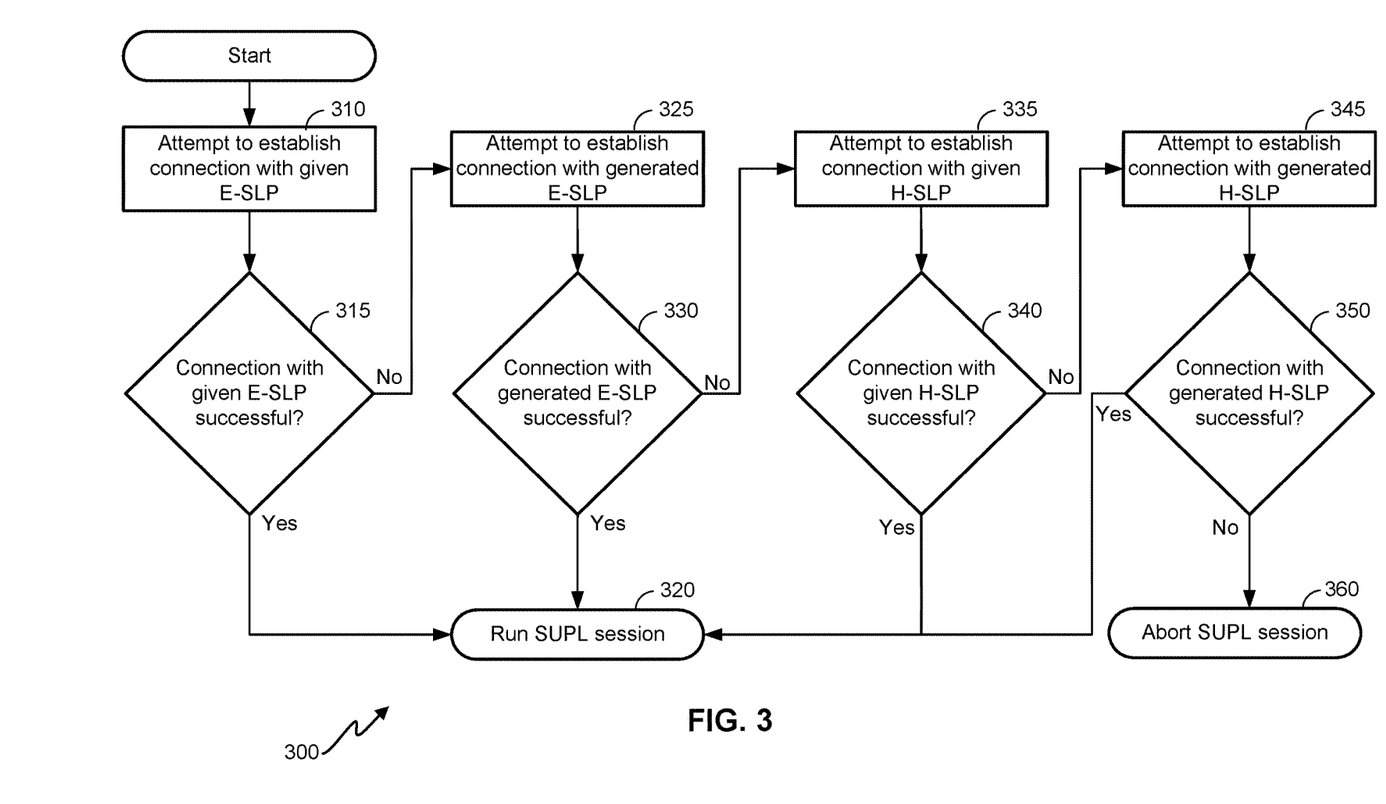
FIG. 3 is a flow diagram of a method for establishing a secure connection between a SET and an SLP in an emergency SUPL session, according to an embodiment.

FIG. 3 is a flow diagram of a method 300 for establishing a secure connection between a SET and an SLP in an emergency SUPL session, according to an embodiment. Any or all of the functions illustrated in FIG. 3 may be performed by a SET (e.g., the SET 105 of FIG. 1 and/or the SET of FIG. 2). The method 300 may be performed as part of the functionality in block 235 of FIG. 2. Means for performing these functions can include software and/or hardware components such as those illustrated in FIG. 6 below.

The method 300 can start at block 310, where the SET can attempt to establish a connection with the given E-SLP. That is, the SET can attempt to establish a connection using the FQDN of the E-SLP given to the SET in the SUPL INIT message. At block 315, if the connection with the given E-SLP is successful, then the SET runs the SUPL session at block 320.

Establishing a connection with an SLP (either E-SLP or H-SLP) as illustrated in the method 300, can comprise a variety of steps. These steps may be governed by applicable standards and protocols. In some embodiments, for example, establishing a connection can include the SET providing the network with the FQDN of the SLP, the network performing a domain name system (DNS) query to determine the IP address of the SLP, an exchange of certificate and/or deployment service (DLS) server information between the E-SLP and the SET, and the establishment of a TCP/IP connection.

If the connection with the given E-SLP is not successful, then the SET can attempt to establish a connection with an generated E-SLP, at block 325. That is, the SET can generate an FQDN for a second E-SLP (other than the given E-SLP from block 310) based, for example, on information received from the network. The SET can then attempt to connect with the second E-SLP based on the generated FQDN.

For example, according to some embodiments, the SET can obtain the MMC mobile country code (MCC) and a mobile network code (MNC) associated with a mobile network. The MCC comprises a code indicative of the country in which the SET is located, and the MNC comprises a code indicative of the particular carrier with which the SET is communicating (e.g., the carrier network 140 of FIG. 1). The SET can then generate the FQDN based on this information, using a manner similar to the generation of an SLP defined in the OMA a standard (e.g., "e-slp.mnc<MNC>.mcc<MCC>.pub.3gppnetwork.org"). If the connection with the generated E-SLP is successful at block 330, then the SET can run the SUPL session at block 320.

If the connection with the generated E-SLP is not successful, the method can proceed with the functionality at block 335, where the SET attempts to establish connection with the given H-SLP. Here, the "given H-SLP" may comprise the default H-SLP of the SET, the FQDN of which may be hardcoded or otherwise preprogrammed into the SET in accordance with OMA standards. If the connection with the given H-SLP is successful at block 340, then the SET will run the SUPL session at block 320.

If the connection with the given H-SLP is not successful, then the SET can attempt to establish a connection with an generated H-SLP, at block 345. Here, the functionality of generating an H-SLP (or, more precisely, the FQDN of a second H-SLP different than the given H-SLP) can be similar to the functionality performed at block 325. However, instead of using information about the network (such as MCC and MNC) to generate an FQDN of an E-SLP, the SET can use that information to generate an FQDN of an H-SLP. If the connection with the generated H-SLP is successful at block 350, then the SET will run the SUPL session at block 320. Otherwise, the SET can finally abort the SUPL session at block 360.

Figure 4:
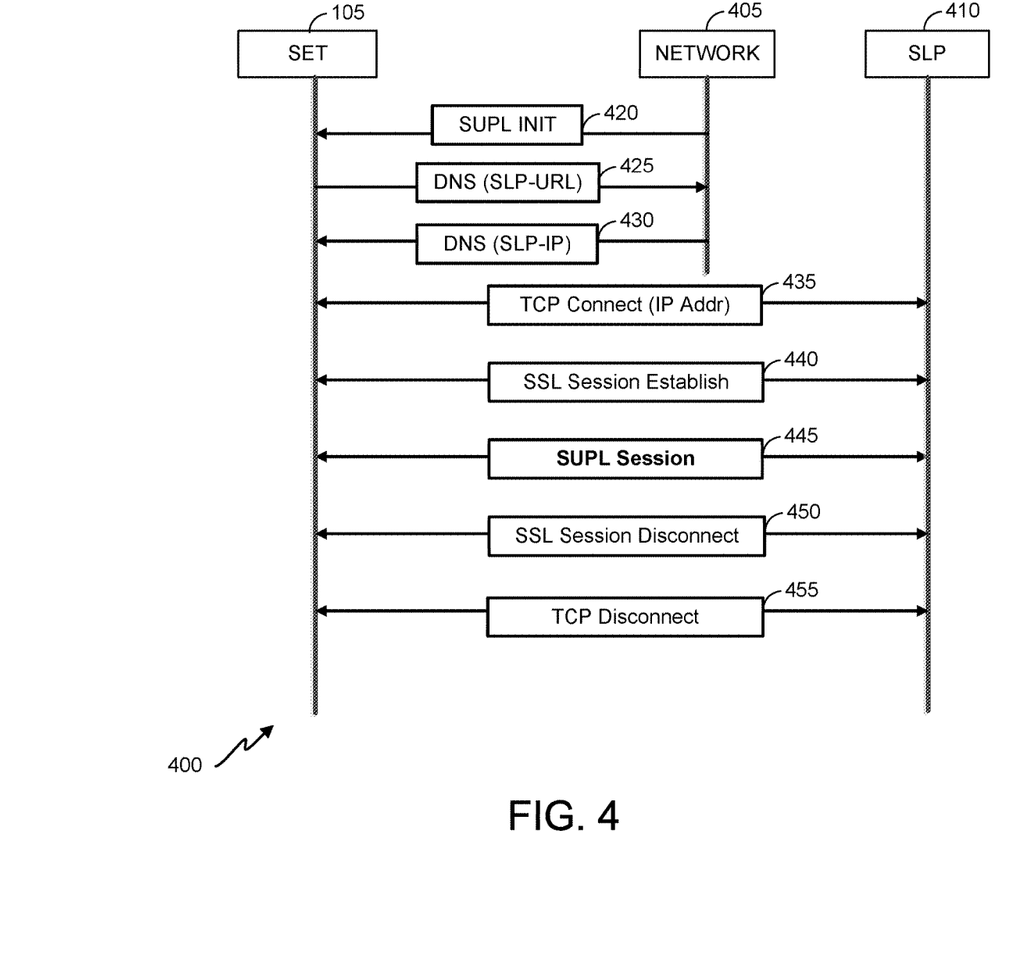
FIG. 4 is a call flow diagram illustrating one embodiment of how the SET and SLP may communicate to establish a connection.

As mentioned previously, the SET can attempt to establish a connection with a given SLP using a series of steps that may be governed by applicable protocols and/or standards. FIG. 4 is a call flow diagram 400 illustrating one embodiment of how the SET, network, and SLP may communicate to establish a connection. Here, the SET 105 may correspond with the SET 105 described in previous embodiments. The SLP 410 may correspond with an E-SLP or H-SLP as determined, for example, by the method illustrated in FIG. 3. The network 405 may generally correspond with components of the carrier network 140 and systems connected therewith, such as the PSAP 150 illustrated in FIG. 1. Functions illustrated in FIG. 4 (e.g., TCP connections, SSL sessions, DNS lookup, and the like) may be performed in accordance with governing standards and/or protocols.

At block 420 the process can begin when the network 405 provides the SET 105 with a SUPL INIT message. As indicated in previous embodiments, this message may be generated by a PSAP and delivered to the SET 105 via various components of the network 405. The SUPL INIT message may include the FQDN of an E-SLP with which the SET 105 can first attempt to connect. That said, the remaining functions (blocks 425-455 of FIG. 4) can reflect the call flow used to connect with any SLP (E-SLP or H-SLP) according to the techniques described herein (e.g., the method 300 of FIG. 3).

At block 425, the SET 105 sends a DNS query to the network 405. Here, the DNS query has the URL of the SLP for 10 (which may be obtained, for example, using the techniques described above). The network 405 resolves the domain name of the SLP 410, and provides the corresponding IP address to the SET 105 at block 430.

At block 435, the SET 105 uses the IP address obtained at block 430 to establish a Transmission Control Protocol (TCP) connection with the SLP 410. The SET 105 and SLP 410 can then establish an SSL session 440 to help ensure security of the SUPL session, which is conducted at block 445. Once the SUPL session is completed, the SSL session between the SET 105 and SLP 410 is terminated at block 450, and the TCP connection is disconnected at block 455.

As indicated in the previously described embodiments, if the SET 105 is unable to establish a secure connection with the SLP 410 (e.g., any of the functions at blocks 425, 430, 435, or 440 fails), then the SET 105 may attempt to connect with a different SLP (e.g., in accordance with the method 300 of FIG. 3), restarting the process at block 425.

Figure 5:
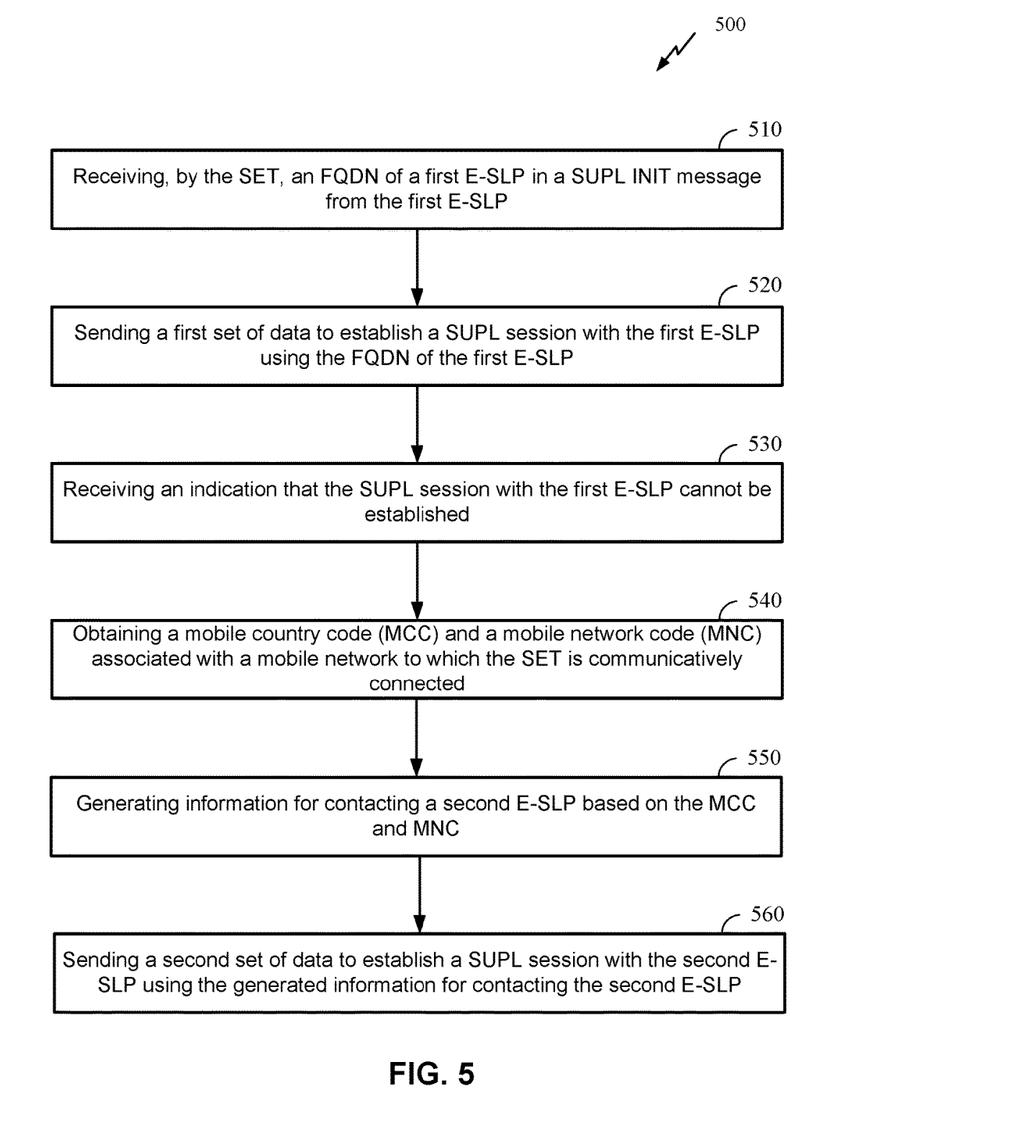
FIG. 5 is a flow diagram of a method of establishing a SUPL session between a SET and an E-SLP, according to one embodiment

FIG. 5 is a flow diagram of a method 500 of establishing a SUPL session between a SET and an E-SLP, according to one embodiment. Means for performing some or all of the blocks illustrated in FIG. 5 may include hardware and/or software components of a mobile device, such as the SET illustrated in FIGS. 1 and 2 and described in embodiments throughout this disclosure. The method 500 can be seen as an embodiment of implementing the method 300 of the flow diagram illustrated in FIG. 3, and may be executed in a SUPL environment having an architecture similar to the system 100 illustrated in FIG. 1. Hardware and/or software components of a mobile device are described in further detail with regard to FIG. 6 below. A person of ordinary skill in the art will appreciate that embodiments may combine, separate, rearrange, and/or otherwise alter the blocks of the method 500 as illustrated in FIG. 5.

At block 510, the functionality includes receiving, by the SET, and FQDN of a first E-SLP in a SUPL INIT message from the first E-SLP. As described previously herein, the SUPL INIT message may be sent to the SET by the first E-SLP, in response to the SET being used to make an emergency call to PSAP. The SUPL INIT message may include information, in addition to the FQDN, that can be used by the SET to establish a SUPL session. This information can include, for example, a SUPL session identifier. Means for performing the functionality described at block 510 can include, for example, processing unit(s) 610, memory 660, wireless communication interface 630, and/or bus 605 of SET 105 as described in FIG. 6.

At block 520, the SET sends a first set of data to establish a SUPL session with the first E-SLP using the FQDN of the first E-SLP (provided in the SUPL INIT message). As discussed previously, the first set of data can be governed by applicable standards and/or protocols, and may generally proceed as described in FIG. 4. The first set of data may comprise data sent by the SET in an attempt to establish a SUPL session, which may comprise information needed for resolving an IP address, establishing a TCP connection, or an SSL session. For example, according to some embodiments, sending the first set of data can comprise at sending a DNS query with the FQDN of the first E-SLP, sending a TCP connection request with an IP address of the E-SLP, and/or sending information to the first E-SLP for establishing an SSL session. Additional details regarding the function at block 520 can be found in the description of the embodiment illustrated in FIG. 3 with regard to the functionality described at block 310. Means for performing the functionality described at block 520 can include, for example, processing unit(s) 610, memory 660, wireless communication interface 630, and/or bus 605 of SET 105 as described in FIG. 6.

At block 530, the SET determines that the SUPL session with the first E-SLP cannot be established. Again, this determination may be dictated by applicable standards and/or protocols. According to some embodiments, this determination may be based on a threshold value of a connection timeout with the E-SLP, a threshold number of attempts to connect with the E-SLP, and/or other factors. Means for performing the functionality described at block 530 can include, for example, processing unit(s) 610, memory 660, and/or bus 605 of SET 105 as described in FIG. 6.

At block 540, an MCC and an MNC associated with a mobile network to which the SET is communicatively connected can be obtained. According to some embodiments, this information may be obtained by the SET from the carrier network, e.g., via beaconing information broadcast from the carrier network. Means for performing the functionality described at block 540 can include, for example, processing unit(s) 610, memory 660, wireless communication interface 630, and/or bus 605 of SET 105 as described in FIG. 6.

At block 550, information for contacting a second E-SLP is generated, based on the MCC and MNC. In some embodiments, for example, an FQDN of the second E-SLP can be generated using the MCC and MNC in accordance with techniques for FQDN generation provided by the governing OMA standards. Means for performing the functionality described at block 550 can include, for example, processing unit(s) 610, memory 660, and/or bus 605 of SET 105 as described in FIG. 6.

At block 560, the SET sends a second set of data to establish a SUPL session with the second E-SLP using the generated information for contacting the second E-SLP. Again, this attempt can be governed by applicable standards and/or protocols, and may generally proceed as described in FIG. 4, and thereby may be similar to the first set of data sent in block 520 (as applied to the second E-SLP). Additional details regarding the functionality at block 560 can be found in the description of the embodiment illustrated in FIG. 3 with regard to the functionality described at block 325. Means for performing the functionality described at block 560 can include, for example, processing unit(s) 610, memory 660, wireless communication interface 630, and/or bus 605 of SET 105 as described in FIG. 6.

As noted in previous embodiments, a method of establishing a SUPL session can include additional functionality, including attempting to connect with one or more fallback SLPs. For example, in some embodiments, the method 500 can further include receiving an indication that the SUPL session with the second E-SLP cannot be established, determining a first H-SLP based on a particular carrier for the SET (which may be preprogrammed or hardcoded into the SET), and sending a third set of data to establish a SUPL session with the first H-SLP. Here, the third set of data can be similar to the first set of data and the second set of data, but as applied to the first H-SLP. Embodiments may further include receiving an indication that that the SUPL session with the first H-SLP cannot be established, generating information for contacting a second H-SLP based on the MCC and MNC (e.g., as described above with regard to the functionality at block 345 of FIG. 3) and sending a fourth set of data to establish a SUPL session with the second H-SLP using the generated information for contacting the second H-SLP, where the fourth set of data is also similar to the first set of data and the second set of data, but as applied to the second H-SLP.

Embodiments may include additional features, depending on desired functionality. For example, according to some embodiments, the SUPL session with the second E-SLP comprises a secure TLS connection. The SUPL INIT message may be received by the SET via SMS, UDP, and/or IP. A person of ordinary skill in the art will recognize that embodiments may include many additional variations to the functionality illustrated in FIG. 5.

Figure 6:
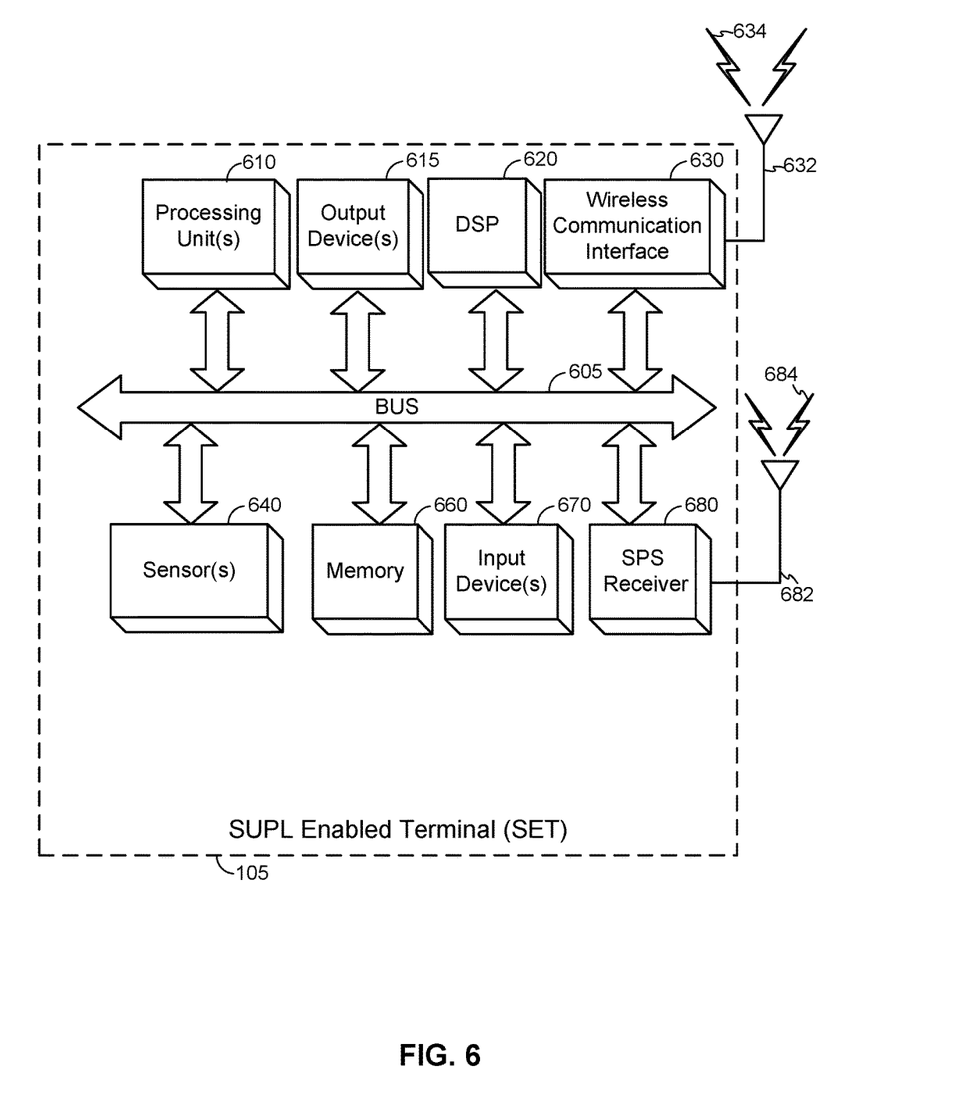
FIG. 6 is a block diagram an embodiment of a SET.

FIG. 6 is a block diagram an embodiment of a SET 105, which can be utilized as described herein above. For example, the SET 105 can be used in the system 100 of FIG. 1, perform some or all of the functionality described in reference to FIGS. 2-5, and/or used as generally described in the embodiments detailed herein. It should be noted that FIG. 5 is meant only to provide a generalized illustration of various components, any or all of which may be utilized as appropriate. It can be noted that, in some instances, components illustrated by FIG. 5 can be localized to a single physical device and/or distributed among various networked devices, which may be disposed at different physical locations.

The SET 105 is shown comprising hardware elements that can be electrically coupled via a bus 605 (or may otherwise be in communication, as appropriate). The hardware elements may include a processing unit(s) 610 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 6, some embodiments may have a separate DSP 620, depending on desired functionality. The SET 105 also may comprise one or more input devices 670, which may comprise without limitation one or more touch screens, touch pads, microphones, buttons, dials, switches, and/or the like; and one or more output devices 615, which may comprise without limitation, one or more displays, light emitting diodes (LEDs), speakers, and/or the like.

The SET 105 might also include a wireless communication interface 630, which may comprise without limitation a modem, a network card, an infrared communication device, a wireless communication device, and/or a chipset (such as a Bluetooth® device, an IEEE 802.11 device, an IEEE 802.15.4 device, a Wi-Fi® device, a WiMAX® device, cellular communication circuitry, etc.), and/or the like. The wireless communication interface 630 may permit data to be communicated with a network, wireless access points, computer systems, and/or any other wireless electronic devices described herein, including the devices illustrated in FIG. 1. The communication can be carried out via one or more wireless communication antenna(s) 632 that send and/or receive wireless signals 634.

Depending on desired functionality, the wireless communication interface 630 may comprise separate transceivers to communicate with base transceiver stations (e.g., eNB 110 of FIG. 1) and other wireless devices and access points. Different data networks may comprise various network types. The wireless communication interface 630 may communicate with a Wireless Wide Area Network (WWAN), which may comprise a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A wireless data network as described herein may comprise a wireless local area network (WLAN) which may be an IEEE 802.11x network, and a wireless personal area network (WPAN) may comprise a Bluetooth network, an IEEE 802.15x, or some other type of network. The techniques described herein may also be used for any combination of WWAN, WLAN, and/or WPAN.

The SET 105 can further include sensor(s) 640. Such sensors may comprise, without limitation, one or more accelerometers, gyroscopes, cameras, magnetometers, altimeters, microphones, proximity sensors, light sensors, and the like. Some or all of the sensor(s) 640 can be utilized to determine movement and/or location, which may be used to in calculating a position estimation in a SUPL session and/or for other location determination purposes.

Embodiments of the mobile device may also include satellite positioning system (SPS) receiver 680 capable of receiving signals 684 from one or more SPS SVs using an SPS antenna 682. Such positioning can be utilized to complement and/or incorporate the techniques described herein. The SPS receiver 680 can extract a position of the mobile device, using conventional techniques, from SPS SVs of an SPS system, such as Galileo, GLONASS, Compass, Quasi-Zenith Satellite System (QZSS) over Japan, Indian Regional Navigational Satellite System (IRNSS) over India, Beidou over China, and/or the like. Moreover, the SPS receiver 680 can be used various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS. In some embodiments, an SPS system may comprise a Global Navigation Satellite System (GNSS) system.

The SET 105 may further include and/or be in communication with a memory 660. The memory 660 may comprise, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 660 of the SET 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the SET 105 (and/or a processing unit within a SET 105 and/or another device communicatively coupled therewith). In an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the memory 660 described above. These instructions might take the form of executable code, which is executable by the SET 105 and/or might take the form of source and/or installable code, which, upon compilation and/or installation on the SET 105 (e.g., using any of a variety of generally available compilers, installation programs, compression/decompression utilities, etc.), then takes the form of executable code.

The techniques described herein may be implemented by various means depending upon applications according to particular features and/or examples. For example, such methodologies may be implemented in hardware, firmware, and/or combinations thereof, along with software. In a hardware implementation, for example, a processing unit (e.g., processing unit(s) 610) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

Figure 7:
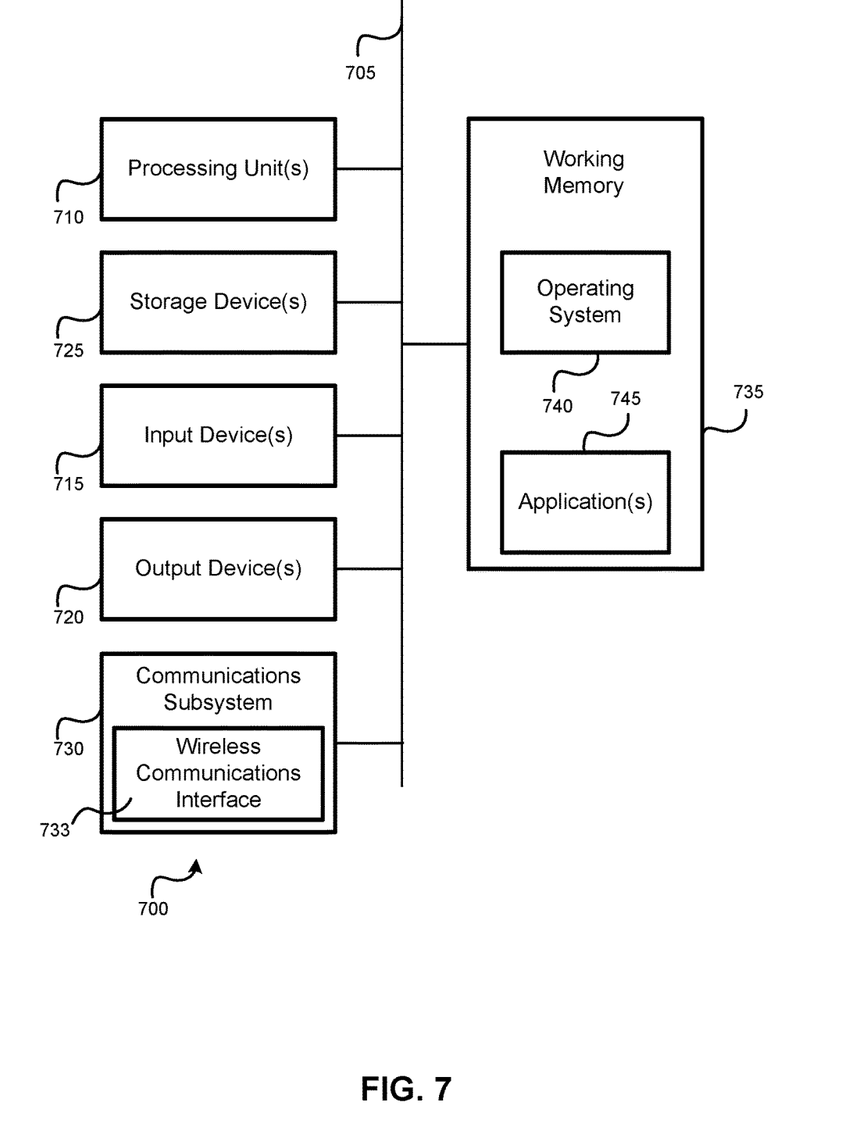
FIG. 7 is a block diagram an embodiment of a computer system.

FIG. 7 is a block diagram an embodiment of a computer system 700, which may comprise or be incorporated, at least in part, into devices described herein, such as the eNB 110, E-SLP 120, H-SLP 130, and/or PSAP 150 of the system 100 of FIG. 1. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner. In addition, it can be noted that components illustrated by FIG. 7 can be localized to a single device and/or distributed among various networked devices, which may be disposed at different physical locations.

The computer system 700 is shown comprising hardware elements that can be electrically coupled via a bus 705 (or may otherwise be in communication, as appropriate). The hardware elements may include processing unit(s) 710, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 700 also may comprise one or more input devices 715, which may comprise without limitation a mouse, a keyboard, a camera, a microphone, and/or the like; and one or more output devices 720, which may comprise without limitation a display device, a printer, and/or the like.

The computer system 700 may further include (and/or be in communication with) one or more non-transitory storage devices 725, which can comprise, without limitation, local and/or network accessible storage, and/or may comprise, without limitation, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 700 might also include a communications subsystem 730, which may comprise wireless communication technologies managed and controlled by a wireless communication interface 733, as well as wired technologies. As such, the communications subsystem may comprise a modem, a network card (wireless or wired), an infrared communication device, a wireless communication device, and/or a chipset (such as a Bluetooth® device, an IEEE 802.11 device, an IEEE 802.15.4 device, a Wi-Fi® device, a WiMax® device, cellular communication facilities, ultra wide band (UWB) interface, etc.), and/or the like. The communications subsystem 730 may include one or more input and/or output communication interfaces, such as the wireless communication interface 733, to permit data to be exchanged with a network, mobile devices (such as a SET), other computer systems, and/or any other electronic devices described herein. Hence, the communications subsystem 730 may be used to receive and send data as described in the embodiments herein.

In many embodiments, the computer system 700 will further comprise a working memory 735, which may comprise a RAM or ROM device, as described above. Software elements, shown as being located within the working memory 735, may comprise an operating system 740, device drivers, executable libraries, and/or other code, such as one or more applications 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 725 described above. In some cases, the storage medium might be incorporated within a computer system, such as computer system 700. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform, such as the memory 660 of the SET 105 shown in FIG. 6 and/or storage device(s) 725 of computer system 700 shown in FIG. 7. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing", "computing", "calculating", "determining", "generating", "obtaining", "modifying", "selecting", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method of establishing a Secure User Plane Location (SUPL) session between a SUPL Enabled Terminal (SET) and an Emergency SUPL Location Platform (E-SLP), the method comprising:
   receiving, by the SET, a Fully-Qualified Domain Name (FQDN) of a first E-SLP in a SUPL INIT message from the first E-SLP;
   sending a first set of data to establish a SUPL session with the first E-SLP using the FQDN of the first E-SLP;
   receiving an indication that the SUPL session with the first E-SLP cannot be established;
   obtaining a mobile country code (MCC) and a mobile network code (MNC) associated with a mobile network to which the SET is communicatively connected;
   generating information for contacting a second E-SLP based on the MCC and MNC; and
   sending a second set of data to establish a SUPL session with the second E-SLP using the generated information for contacting the second E-SLP.

2. The method of claim 1, further comprising:
   receiving an indication that the SUPL session with the second E-SLP cannot be established;
   determining a first Home SUPL Location Platform (H-SLP) based on a particular carrier for the SET; and sending a third set of data to establish a SUPL session with the first H-SLP.

3. The method of claim 2, further comprising:
receiving an indication that the SUPL session with the first H-SLP cannot be established;
generating information for contacting a second H-SLP based on the MCC and MNC; and
sending a fourth set of data to establish a SUPL session with the second H-SLP using the generated information for contacting the second H-SLP.

4. The method of claim 1, wherein the SUPL session with the second E-SLP comprises a secure Transport Layer Security (TLS) connection.

5. The method of claim 1, wherein the SUPL INIT message is received by the SET via Short Message Service (SMS).

6. The method of claim 1, wherein the SUPL INIT message is received by the SET via User Datagram Protocol (UDP) or Internet Protocol (IP), or both.

7. The method of claim 1, wherein the SUPL INIT message is received in response to an emergency call made from the SET.

8. The method of claim 1, wherein sending the first set of data comprises at least one of:
sending a domain name system (DNS) query with the FQDN of the first E-SLP,
sending a Transmission Control Protocol (TCP) connection request with an Internet protocol (IP) address of the first E-SLP, or
sending information to the first E-SLP for establishing a secure socket layer (SSL) session, or
any combination thereof.

9. The method of claim 1, wherein receiving an indication that the SUPL session with the first E-SLP cannot be established comprises at least one of:
receiving an indication that a domain name of the first E-SLP cannot be resolved,
receiving an indication that a Transmission Control Protocol (TCP) connection with the first E-SLP has not been established or has timed out, or
receiving an indication that an SSL session with the first E-SLP has not been established or has timed out, or
any combination thereof.

10. The method of claim 1, wherein generating information for contacting the second E-SLP comprises generating an FQDN of the second E-SLP.

11. A mobile device comprising a Secure User Plane Location (SUPL) Enabled Terminal (SET), the mobile device comprising:
a wireless communication interface;
a memory; and
a processing unit communicatively coupled with the wireless communication interface and the memory, the processing unit configured to cause the mobile device to:
receive, via the wireless communication interface, a Fully-Qualified Domain Name (FQDN) of a first Emergency SUPL Location Platform (E-SLP) in a SUPL INIT message from the first E-SLP;
send, via the wireless communication interface, a first set of data to establish a SUPL session with the first E-SLP using the FQDN of the first E-SLP;
receive, via the wireless communication interface, an indication that the SUPL session with the first E-SLP cannot be established;
obtain a mobile country code (MCC) and a mobile network code (MNC) associated with a mobile network to which the mobile device is communicatively connected;
generate information for contacting a second E-SLP based on the MCC and MNC; and
send, via the wireless communication interface, a second set of data to establish a SUPL session with the second E-SLP using the generated information for contacting the second E-SLP.

12. The mobile device of claim 11, wherein the processing unit is further configured to cause the mobile device to:
receive, via the wireless communication interface, an indication that the SUPL session with the second E-SLP cannot be established;
determine a first Home SUPL Location Platform (H-SLP) based on a particular carrier for the mobile device; and
send, via the wireless communication interface, a third set of data to establish a SUPL session with the first H-SLP.

13. The mobile device of claim 12, wherein the processing unit is further configured to cause the mobile device to:
receive, via the wireless communication interface, an indication that the SUPL session with the first H-SLP cannot be established;
generate information for contacting a second H-SLP based on the MCC and MNC; and
send, via the wireless communication interface, a fourth set of data to establish a SUPL session with the second H-SLP using the generated information for contacting the second H-SLP.

14. The mobile device of claim 11, wherein the processing unit is further configured to cause the mobile device to establish a secure Transport Layer Security (TLS) connection with the second E-SLP.

15. The mobile device of claim 11, wherein the processing unit is further configured to cause the mobile device to receive the SUPL INIT message by Short Message Service (SMS).

16. The mobile device of claim 11, wherein the processing unit is further configured to cause the mobile device to receive the SUPL INIT message by User Datagram Protocol (UDP) or Internet Protocol (IP), or both.

17. The mobile device of claim 11, wherein the processing unit is further configured to cause the mobile device to receive the SUPL INIT message in response to an emergency call made from the mobile device.

18. The mobile device of claim 11, wherein the processing unit is further configured to cause the mobile device to send the first set of data by sending at least one of:
a domain name system (DNS) query with the FQDN of the first E-SLP,
a Transmission Control Protocol (TCP) connection request with an Internet protocol (IP) address of the first E-SLP, or
information to the first E-SLP for establishing a secure socket layer (SSL) session, or
any combination thereof.

19. The mobile device of claim 11, wherein the processing unit is further configured to cause the mobile device to receive the indication that the SUPL session with the first E-SLP cannot be established by receiving at least one of:
an indication that a domain name of the first E-SLP cannot be resolved,
an indication that a Transmission Control Protocol (TCP) connection with the first E-SLP has not been established or has timed out, or an indication that an SSL session with the first E-SLP has not been established or has timed out, or any combination thereof.

20. The mobile device of claim 11, wherein the processing unit is further configured to cause the mobile device to generate the information for contacting the second E-SLP by generating an FQDN of the second E-SLP.

21. An apparatus for establishing a Secure User Plane Location (SUPL) session between a SUPL Enabled Terminal (SET) and an Emergency SUPL Location Platform (E-SLP), the apparatus comprising:

means for receiving a Fully-Qualified Domain Name (FQDN) of a first E-SLP in a SUPL INIT message from the first E-SLP;

means for sending a first set of data to establish a SUPL session with the first E-SLP using the FQDN of the first E-SLP;

means for receiving an indication that the SUPL session with the first E-SLP cannot be established;

means for obtaining a mobile country code (MCC) and a mobile network code (MNC) associated with a mobile network to which the SET is communicatively connected;

means for generating information for contacting a second E-SLP based on the MCC and MNC; and means for sending a second set of data to establish a SUPL session with the second E-SLP using the generated information for contacting the second E-SLP.

22. The apparatus of claim 21, further comprising:

means for receiving an indication that the SUPL session with the second E-SLP cannot be established;

means for determining a first Home SUPL Location Platform (H-SLP) based on a particular carrier for the SET; and means for sending a third set of data to establish a SUPL session with the first H-SLP.

23. The apparatus of claim 22, further comprising:

means for receiving an indication that the SUPL session with the first H-SLP cannot be established;

means for generating information for contacting a second H-SLP based on the MCC and MNC; and means for sending a fourth set of data to establish a SUPL session with the second H-SLP using the generated information for contacting the second H-SLP.

24. The apparatus of claim 21, further comprising means for establishing a secure Transport Layer Security (TLS) connection.

25. The apparatus of claim 21, further comprising means for receiving the SUPL INIT message via Short Message Service (SMS).

26. The apparatus of claim 21, further comprising means for receiving the SUPL INIT message via User Datagram Protocol (UDP) or Internet Protocol (IP), or both.

27. The apparatus of claim 21, further comprising means for receiving the SUPL INIT message in response to an emergency call made from the SET.

28. The apparatus of claim 21, further comprising means for sending the first set of data by sending at least one of:

a domain name system (DNS) query with the FQDN of the first E-SLP, a Transmission Control Protocol (TCP) connection request with an Internet protocol (IP) address of the first E-SLP, or information to the first E-SLP for establishing a secure socket layer (SSL) session, or any combination thereof.

29. The apparatus of claim 21, further comprising means for receiving the indication that the SUPL session with the first E-SLP cannot be established by receiving at least one of:

an indication that a domain name of the first E-SLP cannot be resolved, an indication that a Transmission Control Protocol (TCP) connection with the first E-SLP has not been established or has timed out, or an indication that an SSL session with the first E-SLP has not been established or has timed out, or any combination thereof.

30. A non-transitory machine-readable medium having instructions embedded thereon for establishing a Secure User Plane Location (SUPL) session between a SUPL Enabled Terminal (SET) and an Emergency SUPL Location Platform (E-SLP), the instructions comprising computer code for:

receiving a Fully-Qualified Domain Name (FQDN) of a first E-SLP in a SUPL INIT message from the first E-SLP;

sending a first set of data to establish a SUPL session with the first E-SLP using the FQDN of the first E-SLP;

receiving an indication that the SUPL session with the first E-SLP cannot be established;

obtaining a mobile country code (MCC) and a mobile network code (MNC) associated with a mobile network to which the SET is communicatively connected;

generating information for contacting a second E-SLP based on the MCC and MNC; and sending a second set of data to establish a SUPL session with the second E-SLP using the generated information for contacting the second E-SLP.

* * * * *